United States Patent [19]

Pommerening

[11] 3,867,581

[45] Feb. 18, 1975

[54] UNIVERSAL NIGHT SERVICE CIRCUIT

[75] Inventor: Uwe A. Pommerening, Webster, N.Y.

[73] Assignee: Stromberg-Carlson Corporation, Rochester, N.Y.

[22] Filed: Dec. 29, 1972

[21] Appl. No.: 319,449

[52] U.S. Cl........................... 179/18 BD, 179/18 BE
[51] Int. Cl............................................. H04m 3/54
[58] Field of Search........ 179/18 BD, 18 BE, 27 CB

[56] References Cited

UNITED STATES PATENTS

| | | | |
|---|---|---|---|
| 2,788,393 | 4/1957 | Armstrong | 179/18 BE |
| 3,137.771 | 6/1964 | Klein | 179/18 BE |

OTHER PUBLICATIONS

Completing PBX Calls, Telephony Magazine, Feb. 28, 1953, Vol. 144, No. 9, pp. 22, 24, 32, 34.

*Primary Examiner*—Kathleen H. Claffy
*Assistant Examiner*—C. T. Bartz
*Attorney, Agent, or Firm*—William F. Porter, Jr.; Donald R. Antonelli

[57] ABSTRACT

A universal night service circuit which includes a rerouting function so that, subsequent to establishment of a connection to a subscriber station from an outside line through the night service circuit, the system automatically functions to establish a parallel path directly through the link networks to the subscriber station bypassing the night service circuit, thereby making the night service circuit immediately available for another night service call.

26 Claims, 7 Drawing Figures

FIG. I

UNIVERSAL NIGHT SERVICE CIRCUIT

The present invention relates in general to automatic telephone systems, and more particularly to a universal night service circuit for an electronic private automatic branch exchange system.

The basic function of the night service circuit as provided in private branch exchange systems is quite well known. During evening hours, when the operator positions are not staffed, the system having a night service circuit will automatically transfer calls destined for the operator to the night service circuit, which then automatically signals the night service attendant.

There are generally two basic types of night service circuits. The predetermined night service circuit will contact only a predetermined night attendant station in response to a request for operator when the operator positions have been all placed on night service. The disadvantage of this arrangement obviously resides in the requirement that the night service attendant remain at the night service station at all times to receive incoming calls. This restriction on the movements of the night service attendant prevents him from performing duties other than those of an operator.

The second general type of night service circuit is the universal night circuit, which contacts the night service attendant by actuating an indicator, such as a buzzer, bell, or light, which may be detected at various locations throughout the facility serviced by the telephone system. Upon detecting the alarm, the night service attendant may then access the night service circuit from any available subscriber station which is close at hand by merely dialing a special number dedicated to the night service circuit. This arrangement is clearly more advantageous since it permits the night service attendant to move throughout the facility to perform other duties. Thus, the duties of the night service attendant may be performed by a night watchman or guard.

In the conventional universal night service arrangement, the outside world is automatically connected to the night service circuit upon dialing the listed directory number of the exchange, and when the night service attendant dials the special number of the night service circuit, the attendant is then connected through the night service circuit to the outside party. As a result, the night service circuit forms a part of the communication connection between the night service attendant and the outside world and is therefore tied up for the duration of that call and will not be available for service until the call is terminated.

In accordance with the present invention, a universal night service circuit is provided which is only temporarily connected to the trunk associated with the outside party and the subscriber station occupied by the night service attendant, and effects a rerouting of the call to provide a direct connection of the night service attendant to the outside world, so that it may be free and available for use during the duration of the call. In this way, less equipment is required in the system to perform the night service operation.

It is an object of the present invention to provide a night service circuit for an electronic private automatic branch exchange system which avoids the difficulties and disadvantages inherent in conventional night service circuits.

It is another object of the present invention to provide a night service circuit for an electronic private automatic branch exchange system which is capable of providing efficient service with less equipment than previously needed to perform such operations.

It is a further object of the present invention to provide a night service circuit for an electronic private automatic branch exchange system which is quite simple and economic, while being very dependable and flexible in use.

These and other objects, features, and advantages of the present invention will become more apparent from the following detailed description thereof, when taken in conjunction with the accompanying drawings, which illustrate one embodiment of the present invention, and wherein:

FIGS. 1–3, when arranged in numerical order, illustrate a basic schematic block diagram of an electronic private automatic branch exchange system with which the night service circuit of the present invention may operate;

In our copending application Ser. No. 293,518, filed Sept. 29, 1972, we have disclosed an electronic private automatic branch exchange system having a capacity for automatically processing calls in connection with a large, substantially unlimited, number of subscriber stations. In order to obtain a system of this type, the characteristic equipment of a private automatic branch exchange was combined with the switching equipment of a central office thereby providing an exchange of substantially unlimited size. One of the features of the private branch exchange system disclosed in that application relates to the automatic transfer of a call from the outside world from one subscriber to a second subscriber upon request by the first subscriber through the provision of transfer circuits and a transfer common circuit. The details of the transfer circuits and transfer common circuit are also described in our copending application Ser. No. 293,681, filed Sept. 29, 1972, now U.S. Pat. No. 3,806,661.

In order to provide a full description of the operation of the night service circuit of the present invention and enable a full understanding of the essential features thereof, a general description of the electronic private automatic branch exchange system disclosed in the aforementioned copending application Ser. No. 293,518 will be presented in connection with FIGS. 1–3; however, it should be understood that the present invention may be applied to other private automatic branch exchange systems than the one specifically described herein. It should also be understood that the following description of the system illustrated in FIGS. 1–3 will be confined to those operations having some relationship to the function of the night service circuit of the present invention.

GENERAL SYSTEM DESCRIPTION

Figure 1:
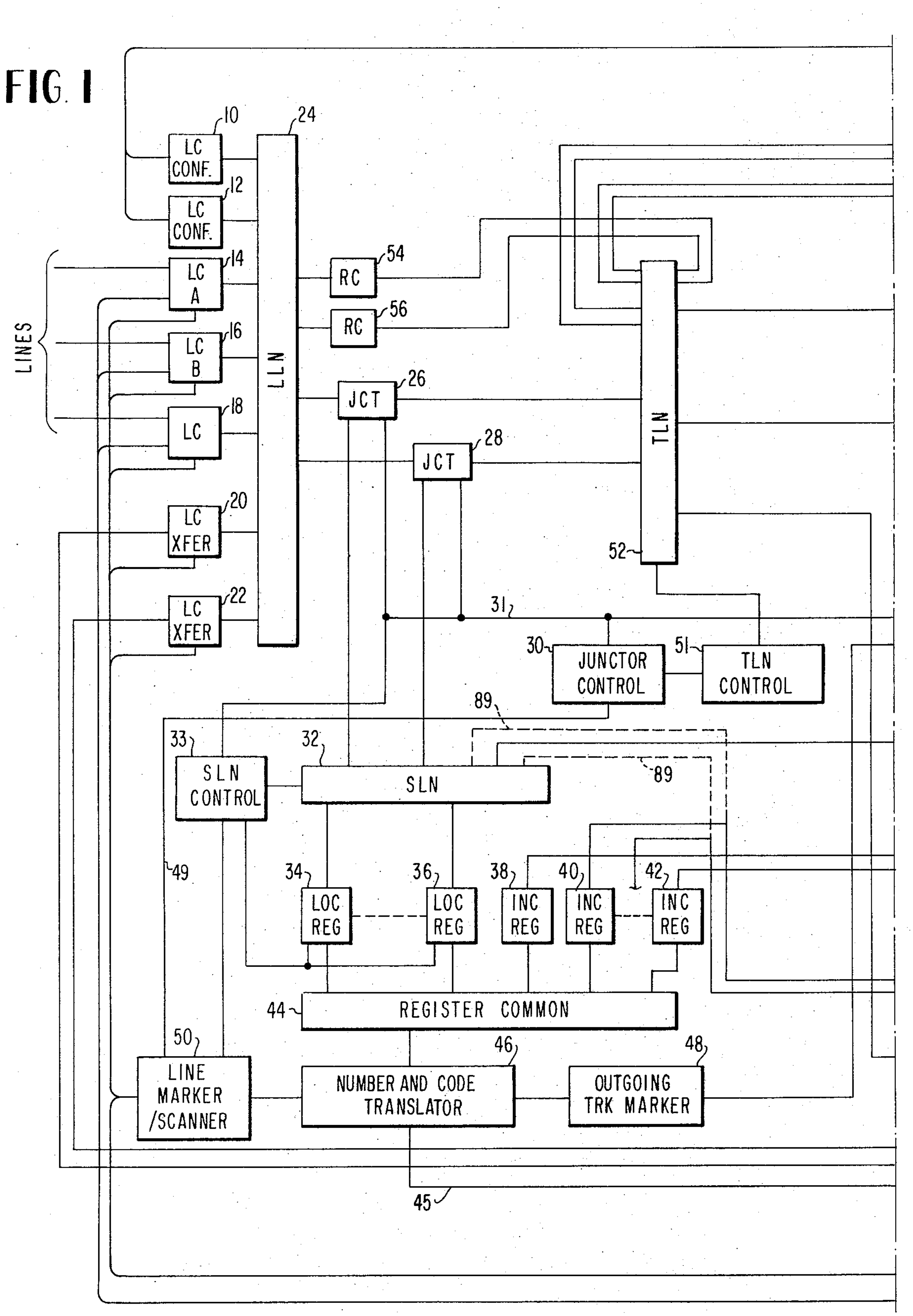
Figure 2:
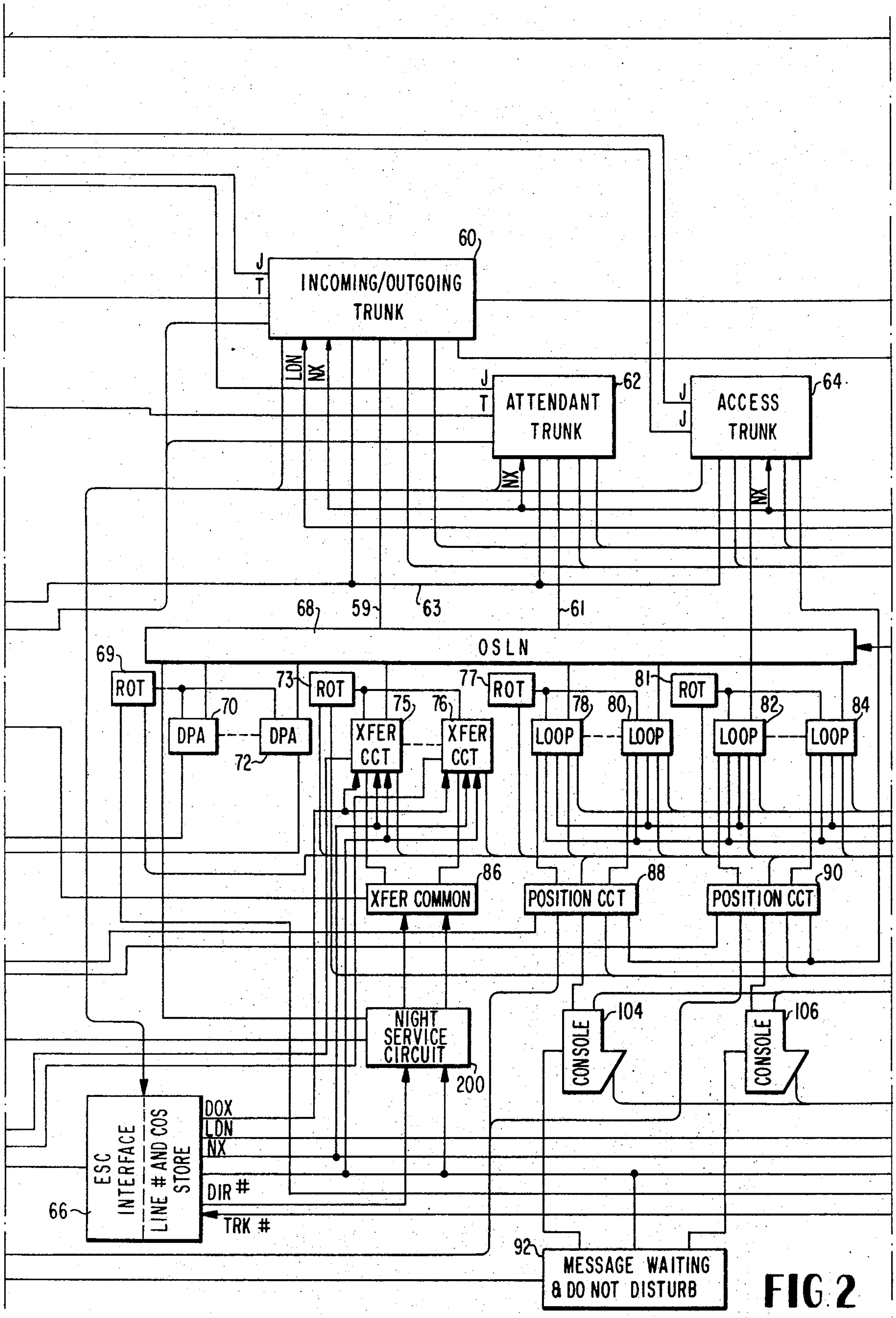
Figure 3:
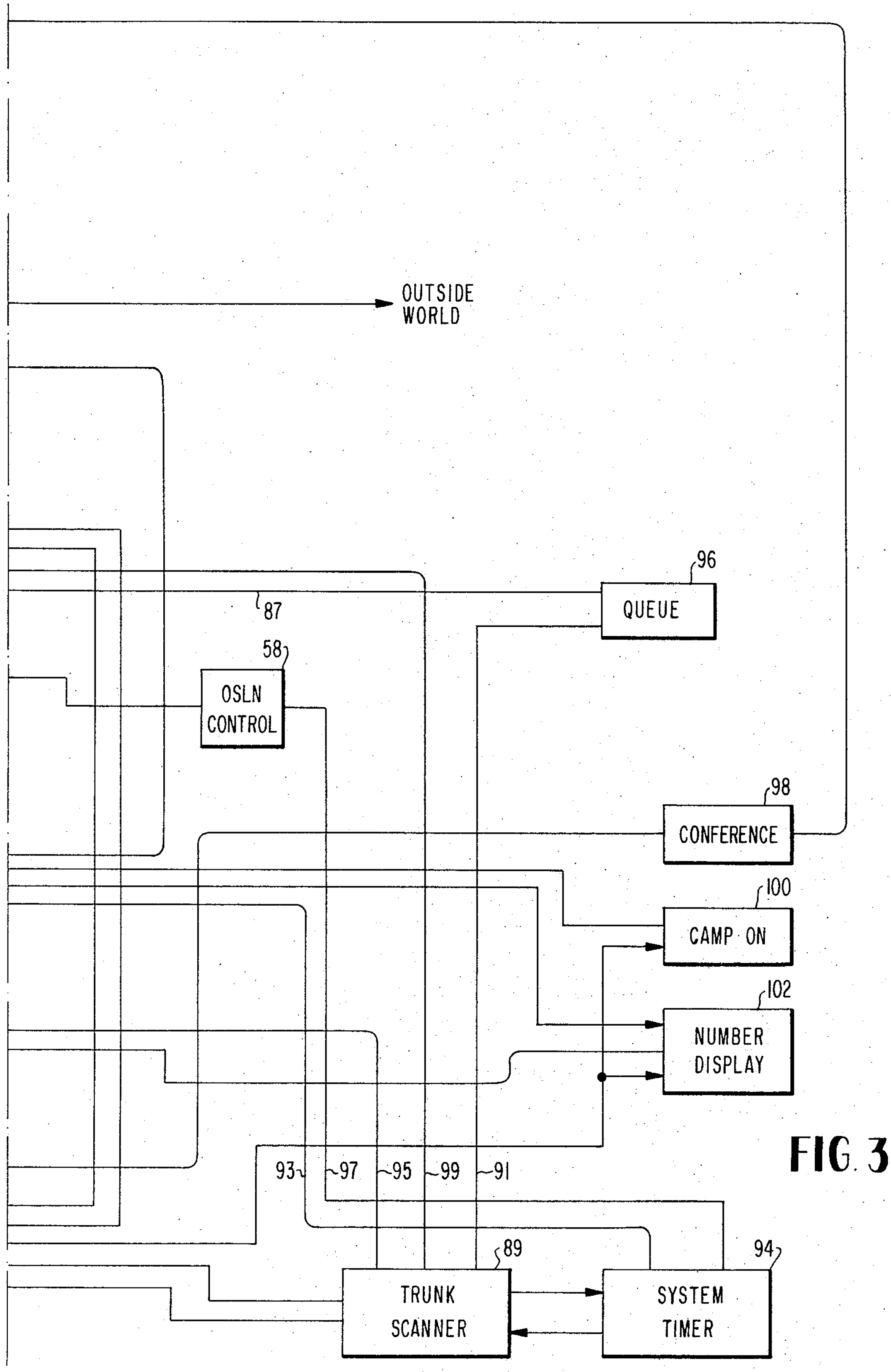

It will be seen from the drawings that FIG. 1 represents that portion of the system which characteristically relates to an electronic switching central (ESC); while, FIGS. 2 and 3 provide equipment which typically forms part of a private branch exchange. Thus, the most basic feature of the present invention, which provides for the combination of an electronic switching central with a private branch exchange, can be most readily recognized from FIGS. 1–3.

Looking first to the portion of the system illustrated in FIG. 1, which provides the typical ESC equipment, there is included a line link network (LLN) 24 which functions as a concentrator for originating line calls and a fan out for terminating calls. The LLN consists of three states of matrices, for example, and is used for both originating and terminating types of traffic. One end of the LLN 24 is connected to a plurality of line circuits such as the conference line circuits 10 and 12, typical subscriber line circuits 14, 16, 18, and transfer line circuits 20 and 22. The number of subscriber line circuits provided vary in number in dependence upon the telephone service to be offered, but may typically exceed four thousand lines. The typical subscriber line circuits 14, 16, and 18 are more fully described in copending U.S. application Ser. No. 153,233, now U.S. Pat. No. 3,708,627 filed on June 15, 1971, by Otto Altenburger, which is assigned to the same assignee as the present invention.

The line link network 24 provides one unique path between line circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path finding need be performed between the ringing controls 54 and 56 and a line circuit through the line link network.

The terminations for the originating paths through the line link network are connected to junctors 26 and 28. The number of junctors and ringing controls provided depends upon the traffic requirements for the system. The ringing controls are more fully described in copending U.S. application Ser. No. 100,647, now U.S. Pat. No. 3,671,678 filed on Dec. 22, 1970, in the name of Otto Altenburger, which is assigned to the same assignee as the present invention. The junctor circuits 26 and 28 and the junctor control circuit 30 is more fully described in copending U.S. application Ser. No. 100,571, now U.S. Pat. No. 3,705,268 filed on Dec. 22, 1970, in the name of Otto Altenburger, also assigned to the same assignee as the present invention.

The junctors 26 and 28 serve as the focal points for all local originating type traffic. The junctors include provisions for connecting the line circuits to the local registers 34 and 36 via a service link network (SLN) 32, and for providing transmission battery for calling and called parties on intra-office calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The dial pulse acceptors function as an interface between the junctors and the local registers, and provide the dial tone to the calling subscriber, detect rotary dial pulses and extend the pulses to storage sections in the local registers.

The local registers consist of a dial pulse acceptor, register storage and register output and a sender for providing outpulsing. The registers and senders are controlled by a register common which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner/marker circuit 50 which has the means to detect service requests and means to access the individual line circuits.

The ringing controls 54 and 56 connect ringing generators to terminating or called stations, detect off-hook conditions (ring-trip) of the called station, and provide ring-back tone for the calling station. Each line circuit can be connected to any one of a plurality of ringing controls which are accessed from a trunk link network (TLN) 52 so that a ringing control is automatically connected to the terminating line circuit as soon as a connection to that line is complete.

A line scanner-marker circuit 50 continuously checks the line circuits for an off-hook condition. The line scanner/marker circuit is used for both originating and terminating types of traffic. In the event of originating traffic, line scanning stops when an off-hook condition is detected and transmits the information from its counter circuits to a marker circuit to mark the particular line circuit and enables the SLN control 33 to initiate a path-finding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required through the junctor control 84 to the ringing control 34. The line scanner/marker circuit 50 is more fully described in copending U.S. application Ser. No. 101,091, now U.S. Pat. No. 3,699,263 filed on Dec. 23, 1970, in the names of Gunter Neumeier and Otto Alternburger, which is assigned to the same assignee as the present invention.

The trunk link network (TLN) 52 provides for the termination of the local traffic to local subscribers, the termination of incoming calls from other exchanges to the local subscribers, and for the connection of outgoing calls from local subscribers to other external exchanges. The TLN 52 includes D and E stage matrices.

When further expansion is necesary, an F stage matrix can also be included. The D stage of the matrix is the entrance to the TLN and is connected to the local junctors, such as junctors 26 and 28. The F stage is the output or exit of the TLN and is connected via the ringing controls to the line link network 24 and also to the trunk circuits.

Path-finding through the trunk link network 52 is performed under the control of the TLN control 51 and the junctor control 30. The TLN control 51 and the junctor control 30 work together in completing the termination portion of a call, whether it is an internally terminated call, or an outgoing call to a distant office. The number and code translator 46 and line scanner/-marker 50 are used to complete calls to local lines, and the number and code translator, together with the outgoing trunk marker 48 complete calls to the trunks. The path-finding scheme of the TLN control 51 includes a two-step scan. The junctor has been previously marked, and furthermore, the information in the local registers is transmitted via the register common 44 to the number and code translator 46 at this time. In the event of a call terminating to a local subscriber, the number and code translator 46 via the line scanner/-marker circuit 50 marks the line circuit of the terminating call. In the event of an outgoing call, the number and code translator 46 via the outgoing trunk marker circuit 48 marks the particular trunk circuit.

The path-finding sequences through the SLN and the TLN are more fully described in copending U.S. application Ser. No. 153,221, filed on June 15, 1971, in the name of Otto Altenburger and Robert Bansemir, which application is assigned to the same assignee as the present invention.

Looking now to the portion of the system illustrated in FIGS. 2 and 3, which includes the PBX portion of the system, five types of trunk circuits may be provided in the telephone system of the present invention; however, only a universal (incoming/outgoing) trunk 60 providing direct inward and direct outward dialing, an attendant trunk 62, and access trunk 64 are illustrated. The access trunks 64 are used solely by the operators to iriginate calls to the subscriber stations while the attendant trunks 62 are used by the local stations for access to the operator, from which they can be extended to another trunk or local station. The universal trunks 60 interface the telephone exchange with distant offices. Each of the universal trunks 60 and attendant trunks 62 have J and T port appearances at both the originating and terminating ends of the trunk link network 52, while the access trunks 64 have only two line port appearances J on the originating ends of the trunk link network. The outgoing trunk marker 48 is connected to each of the universal trunks 60 and attendant trunk 62 and serves to select a trunk circuit for a call originated by one of the local subscribers in response to the dialed digits as analyzed by the number and code translator 46.

An operator service link network (OSLN) 68 is provided for connecting the trunks 60, 62 and 64 to the operators, or to a transfer circuit or DPA, under control of the OSLN control 58. The attendant turrets 104 and 106 are connected through operator position circuits 88 and 90, respectively, and through a plurality of loop circuits 78, 80, 82, 84 to the operator's end of the OSLN 68. The position circuits 88 and 90 are each connected to a group of loop circuits 78–80 and 82–84, respectively, each group being associated with a respective rotary 77 and 81 which serves to preselect an available loop for connecting to the position circuit in preparation for a request for connection from a trunk to the operator position circuit through the OSLN 68. The position circuits 88 and 90 are connected to the system timer and trunk scanner forming the common control for the PBX portion of the system, and the position circuits also are directly connected to a dedicated incoming register, such as the register 40, associated with the register common 44 and number and code translator 46 in the ESC portion of the system.

The universal trunk circuit 60 may also be connected through the OSLN to a dial pulse acceptor 70–72, which are connected to a dedicated incoming register, such as 38 or 40, respectively. The dial pulse acceptors are also preselected by a rotary 69 for connection through the OSLN to a trunk upon request for service and are accessed from the trunk scanner.

The universal trunks 60 may also be connected through the OSLN 68 to a transfer circuit 74–76 which is connected to a dedicated transfer line circuit 20–22 at the input of the line link network 24. The transfer circuits are also preselected by a rotary 73 in preparation for a request for connection through the OSLN to a universal trunk 60. The transfer operation includes the use of a transfer common 86 which is connected to the transfer circuits and has a dedicated input to the service link network 32 for obtaining access to a local register 34–36. The transfer circuits 74–76 and tranfer common 86 are also connected to the system timer 94 and trunk scanner 89 which accesses and times the operations of these circuits.

A queue 96 is provided in association with the universal trunks 60 and attendant trunks 62 to provide for servicing of requests for the operator on a first-come, first-served basis. The queue 96 is connected between each of the universal and attendant trunks and the trunk scanner 89 and serves to forward to the trunk scanner the request for operator signals as they appear at the output of the queue in conjunction with the scanning of the particular trunk by the trunk scanner. The trunk scanner 89 scans each of the universal trunks 60, attendant trunks 62, and access trunks 64 in sequential order and is stopped in its scanning on a particular trunk upon receiving a request for service signal in connection with that trunk. The request for service signal may relate to a request for an operator, a request for a transfer circuit, or the request for a DPA in connection with a direct inward dialed call. If an available loop circuit, transfer circuit or DPA is available upon receipt of the request for service in the trunk scanner, a stop scan signal will be generated and the request for service signal will be forwarded to the circuits of the type requested.

The system timer 94 scans each of the operator position circuits 88–90 and transfer circuits 74–76 in sequential order simultaneously with the more rapid scanning of the dial pulse acceptors 70 and 72. When a stop scan signal has been generated in the trunk scanner 89 and a request for service signal has been forwarded to the circuits of the type requested, the first circuit preselected by the rotary which is scanned by the system timer 94 will be seized and connection through the OSLN 68 from the trunk to the selected circuit will be effected. The details of the operator loop complex including the common control formed by the trunk scanner 89 and system timer 94 are disclosed more fully in our U.S. Pat. No. 3,769,462 issued Oct. 3, 1973, and assigned to the same assignee as the present invention.

The system in accordance with the present invention also provides for various special features circuits including a message waiting and do not disturb system 92, a conference system 98, and a camp-on system 100. The message waiting and do not disturb system is disclosed more fully in our copending U.S. application Ser. No. 351,885, filed Apr. 17, 1973, and the camp-on system is disclosed in U.S. Pat. No. 3,676,606, issued July 11, 1972, being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require for continued monitoring and control certain information relating to the communication connection, such as the calling and called line circuit directory numbers, the class of service of the various parties involved and the numbers of the trunks which may be involved in the call. This type of information is not retained by the ESC portion of the system once the connection through that portion of the system is established and so the present invention provides a PBX-ESC interface and line number store 66 which receives information concerning the subscriber line circuits and the class of service of these circuits at the time the connection through the ESC is effected so that this information may be received and stored in the PBX portion of the system for further use in connection with the special service features. For example, each time a trunk is marked for connection to a subscriber station, the data concerning the subscriber station, including the directory number and class of service thereof, will be forwarded via line 45 to the PBX-ESC interface and line number store 66 for storage therein or for transfer into the trunk circuit itself. For example, the transfer class of service will be forwarded to the trunk circuit upon connection thereof to the subscriber station by enabling of the NX data bus from the store 66 each time a connection to a trunk is effected. In conjunction with the message waiting and do not disturb function performed by the circuit 92, the ESC will pause prior to completing a connection to any line circuit and to request of the message waiting and do not disturb circuit 92 whether that line circuit may be in a do not disturb status. Signalling concerning dialed information from the number and code translator 46 and the PBX portion of the system is also effected through the PBX-ESC interface 66, such as signalling in connection with the dialing from the outside world of the listed director number of the system by enabling the LDN lead or dialing by an inside subscriber of "0" on a transfer operation by enabling the DOX lead.

The operation of the system illustrated by way of example in FIGS. 1–3 will now be described with reference to various connections between the line circuits, outside world and operator positions and certain special features, including the transfer operation, which operations are particularly related to the particular functions of the present invention.

STATION-TO-STATION CALL

The basic call within the system will be the station-to-station call which is handled automatically by the ESC portion of the system. When party A, having line circuit 14, for example, goes off hook, the line marker/scanner 50, which is continuously scanning the line circuits to detect all requests for service, will detect the off-hook condition in the line circuit. The line scanner then actuates the junctor control 30 via line 49 requesting the services of one of the junctors to connect the line circuit 14 to an available local register. The line circuit 14 is marked by the line marker/scanner 50 and an available junctor is marked via line 31. Path-finding through the line link network 24 then commences to connect the line circuit to the junctor.

The register common 44 is also marked by the line marker/scanner 50 to select a local register, and path-finding through the service link network 32 effects connection of the selected junctor to the selected local register. The line circuit 14 is then connected through the line link network 24, an available junctor 26, and service link network 32 to an available local register 34, for example.

Dial tone is returned from the local register 34 to the line circuit 14 and party A commences to dial the number of the called party. The dialed digits are received in the local register 34 and are immediately passed on through the register common 44 to the number and code translator 46, which determines whether the call is to be extended to a station within the system or to the outside world. In the case of the present example, the call is to be extended to a station within the system, and so the number and code translator 46, upon determining the called line circuit identification, actuates the line marker/scanner 50 to effect a busy/free check of the called line circuit, and if free, marks the line circuit 16, for example.

At this point, a switch mark is extended from the local register 34 to the junctor to request the services of the junctor control 30. The junctor control 30 marks the trunk link network from the junctor and path-finding through the trunk link network from the selected junctor 26 to the marked line circuit 16 through the ringing control 56, for example, is effected by the TLN control 51, thereby providing ringing to the called line circuit and ring-back to the calling line circuit. When party B answers, the parties are automatically interconnected and the service equipment, including the junctor control 30, TLN control 51, and local register 34, releases.

The connection between subscriber stations within the system is automatically effected entirely within the ESC equipment. Thus, no data concerning this call is used from the PBX to ESC interface 66, since no transfer or other functions associated with the PBX portion of the system are required or possible in connection with this type of call.

LINE-TO-LINE OPERATOR POSITION

As in the conventional system, if a party desires communicaticn with the operator, the digit 0 is dialed or keyed. This digit which indicates a request for the operator is detected in the number and code translator 46 are receipt in the local register 34, for example, and the translator 46 accesses the outgoing trunk marker 48 to mark an available attendant trunk 62 at the trunk output thereof. At the same time, a switch mark is extended from the register 34 to the junctor 26, for example, which accesses the junctor control 30 so that a mark is extended from the junctor to the trunk link network 52. Path-finding through the trunk link network 52 is commenced under control of the TLN control 51 and the line circuit 14 is connected via the line link network 24, junctor 26 and trunk link network 52 to the J appearance of the attendant trunk 62.

As indicated above, at the time the trunk 62 is marked from the outgoing trunk marker 48, the translator forwards the calling party directory number, class of service and transfer data through the PBX to ESC interface and store 66. If party A associated with the line circuit 14 does not have transfer service available, the NX bus from the ESC interface and store 66 will be enabled to store this data in the attendant trunk 62. Thus, if party A attempts to initiate a transfer operation after a connection is established, the NX data stored in the attendant trunk 62 will inhibit the attempt at transfer.

When the line circuit has been connected to the attendant trunk 62, the identifying number of the attendant trunk 62 is transferred into the queue 96 where the trunk numbers are stored in the order of receipt. When the trunk scanner 89, which continuously scans all of the universal trunks 60, attendant trunks 62, and access trunks 64, accesses the selected attendant trunk 62, a QRFS signal will be transferred from the attendant trunk to the queue 96 and the number of the attendant trunk 62 received from the trunk scanner 89 will be compared to the trunk number at the output of the queue 96 to determine whether that particular trunk is to be serviced next in the order of priority. If the number transmitted from the trunk scanner 89 corresponds to the number at the output of the queue 96, the queue 96 will generate a GRFS signal which is transmitted to the trunk scanner 89.

The trunk scanner 89 monitors the busy/free condition of the position circuits at all times by direct connection to the rotaries which selectively connect an available loop circuit to the associated position circuit. As soon as a loop is busy, the rotary immediately steps to the next available loop so that a loop is always preselected for connection to the position circuit. Thus, if the rotary is continuously running, it is an indication that the loops associated therewith are all busy, but if the rotary is stationary, it is an indication that a loop is preselected and available.

An indication from the rotaries to the system timer 94 and trunk scanner 89 that a loop is available in conjunction with receipt of a GRFS signal from the queue 96 will result in the GRFS signal being passed on from the trunk scanner 89 from the bus 93 to each of the position circuits. The first position circuit having an available loop which is scanned by the system timer 94 will then pass the GRFS signal on as a mark through the loop to the operator service link network 68. As soon as the attendant trunk 62 is scanned by the trunk scanner 89, it also applies a mark on line 61 to the operator service link network 68, so that the marking of the OSLN from each side will result in a connection of the attendant trunks 62 to the selected position circuit 88 through an available loop 78, for example, upon completion of the path-finding operation under control of the OSLN control 58. The links in the OSLN are scanned automatically during the first one microsecond period of every operator time slot whether or not a GRFS signal is generated. Thus, with the mark extended to one side of the OSLN from the trunk and to the other side thereof from the operator's loop, the loop will be connected to the calling trunk during the particular operator's time slot. Once the call is in the loop, the loop will signal the operator at the operator's console 104, for example, and the operator may connect to the trunk by depressing the proper key on the console. As soon as the operator is connected to the attendant trunk 62, the trunk scanner 89 releases and begins its scan of the other trunks and another free loop associated with the position circuit is preselected by the rotary.

Once a party is connected via its line circuit to the operator, the operator may switch that line to another party within the system or to the outside world.

OUTSIDE WORLD-TO-STATION

The system permits the direct inward dialing (DID) of calls from the outside world to a station within the system. When the outside world seizes a universal trunk 60, the trunk generates an RRFS signal on the common bus 99 to the trunk scanner 89 even if that particular universal trunk 60 is not being scanned by the trunk scanner at that time. In view of the urgency in handling calls from the outside world on a priority basis, the system does not wait for a scanning of the particular universal trunk involved in the incoming call, but operates immediately on the request for service by extending the RRFS signal to the trunk scanner 89, which will extend the request to the two dial pulse acceptors 70 and 72 as soon as the operator time slot presently occurring has been completed. At this time, the trunk scanner 89 inhibits the scanning of the loops and transfer circuits and provides a high speed scanning of the two dial pulse acceptors.

When an available dial pulse acceptor 70, for example, is scanned by the trunk scanner 89 in coincidence with the application of a register request signal RRFS thereto, the mark will be extended through the dial pulse acceptor to the input of the operator service link network OSLN. As soon as the universal trunk 60 is seized, it also applies a mark via line 59 to the other side of the operator service link network OSLN and path-finding through that network will then establish a connection from the universal trunk to the dial pulse acceptor 70.

The incoming dialed digits from the outside world are applied through the universal trunk, the operator service link network OSLN and dial pulse acceptor to the incoming register connected thereto. At this time, the trunk scanner 89 releases and continues its scanning of the other trunk circuits.

The number and code translator 46 analyzes the incoming dialed digits and accesses the line marker and scanner 50 to mark the designated line circuit if the busy/free check thereof indicates that the line circuit is available. The register 38 applies a switch mark via the dial pulse acceptor and operator service link network OSLN to the universal trunk to mark the junctor appearance. With the universal trunk 60 marked and the called line circuit marked, path-finding through the trunk link network 52 establishes a connection from the outside world through the universal trunk 60, trunk link network 52, ringing control, line link network 24, and the called line circuit. Ringing is applied to the called line circuit from the ringing control and ring-back is applied back through the universal trunk to the outside world. When the called line circuit answers, ringing is tripped and the parties are interconnected. At this time, the common control equipment in the ESC, such as the junctor control 30 and incoming register 38, as well as the common control equipment in the PBX portion of the system, such as the dial pulse acceptor, are released. However, at this time the ESC portion of the system marks the universal trunk the called directory number and class of service as well as the NX data is transferred from the PBX interface 58 to the ESC interface and store 66, and the NX data is transferred up to the universal trunk 60, which will thereafter control requests for transfer.

OUTSIDE WORLD-TO-STATION VIA OPERATOR

When the outside world dials the listed directory number of the system, the call is to be extended to the operator; however, until the dialed digits can be analyzed by the number and code translator 46, the system cannot determine whether the call is a direct inward dialed call or a listed directory number call. Accordingly, when the outside world seizes the universal trunk 60, the trunk will be connected through the operator service link network 68 and an available dial pulse acceptor 70 to an available incoming register 38, for example, as indicated previously in connection with a direct inward dialed call (DID).

When the dialed digits have been received by the incoming register 38 and analyzed by the number and code translator 46, the translator will signal the ESC interface and store 66 via line 45 which then signals the universal trunk 60 via the LDN bus that a listed directory number (LDN) has been dialed. The translator also causes the incoming register 38 to extend a switch mark via the dial pulse acceptor 70 and operator service link network OSLN to the trunk 60.

The coincident receipt of the switch pulse and the marking of the LDN bus when detected in the universal trunk 60 prevents the trunk for accessing the junctor control and also causes a QRFS signal to be forwarded to the queue 96 when the universal trunk 60 is next scanned by the trunk scanner 89. The universal trunk 60 is then connected to an available operator through the operator service link network OSLN, an available loop and associated position circuit in a manner similar to that described for the connection of station-to-station calls via the operator. The operator then may connect the incoming line to one of the subscriber stations in the system or back to the outside world to another universal trunk. Where a connection is requested to one of the subscriber stations within the system, the operator merely depresses a register key which places the outside world on hold and accesses the incoming register dedicated to the particular operator position circuit. The connection to the subscriber station is then carried on in the manner of station-to-station calls via the operator.

RECALL FROM UNIVERSAL TRUNK (TRANSFER)

As already indicated, once a connection is established between a subscriber station and the outside world, the subscriber can effect a transfer to a second subscriber station by flashing the hook switch if the transfer class of service is available to him. This transfer operation to a second subscriber station is carried on automatically without the services of the operator, as will be described below. Thus, once a connection has been established to the outside world, if the subscriber wishes to recall the operator, more than just a flash of the switch hook will be necessary.

Assuming that party A having line circuit 14 is connected to the outside world through a universal trunk 60 and further assuming that the party A has a transfer class of service available, as indicated by the NX data stored in the universal trunk 60, a recall to the operator is initiated by a flash of the switch hook. Since the NX data stored in the trunk indicates a transfer class of service is available, the trunk will generate an XRFS signal when it is next scanned by the trunk scanner 89, which signal will be applied directly on the bus 99 to the trunk scanner. Trunk scanning will be stopped at this point if a transfer circuit is available and a mark will be extended from the trunk scanner through the transfer common 86 via bus 95 through the preselected transfer circuit 74, for example, to the operator service link network OSLN. The universal trunk 60 extends a mark on line 59 to the outer side of the OSLN which then connects the trunk to the preselected transfer circuit 74 under control of the OSLN control 58.

Each transfer circuit is connected to a dedicated transfer line circuit connected at the input of the line link network 24. The transfer circuit places the outside world on hold and accesses its transfer line circuit to provide an off-hook condition which can be detected by the line marker/scanner 50. The line marker/scanner 50 then actuates the junctor control 30, marks the line link network input from the transfer line circuit 74 and actuates the register common to select an available local register. The transfer line circuit 20 is then connected through the line link network 24, an available junctor 28 and the service link network 32 to an available local register 34, for example. The local register returns dial tone through the transfer line circuit 20, transfer circuit 74, operator service link network 68, universal trunk 60, trunk link network 52 and line link network 24 to line circuit 14 so that party A may dial the number of a second subscriber station to which connection is requested, or in the present case, may request connection to the operator.

Party A dials the digit 0 which is recognized by the number and code translator 46 as a request for the operator. The translator thus suppresses the generation of a switch mark in the register, which would normally be extended to the junctor and junctor control, and instead signals the ESC interface and store 66 via line 45 to generate a signal DOX indicating that the operator has been dialed on a transfer call. The ESC interface and store 66 marks the DOX bus which forwards the request via the transfer circuit to the universal trunk through the OSLN.

Receipt of the DOX indication in the universal trunk inhibits the XRFS signal and causes the generation of a QRFS signal which is forwarded to the queue along with the identity of the universal trunk. The system then proceeds to establish a connection from the universal trunk through the operator service link network OSLN to an available loop and position circuit to obtain the services of an operator in the manner described previously.

AUTOMATIC TRANSFER

As indicated in the foregoing operation for recall with transfer, once party A having line circuit 14 is connected to a local register 34 through a universal trunk 60, operator service link network 68, transfer circuit 74, transfer line circuit 20, line link network 24, junctor 28, and service link network 32 as a result of a switch hook flash, dial tone is returned to party A from the local register 34 enabling the dialing of a second subscriber station. Assume party A having line circuit 14 dials the number of party B having line circuit 16. The dialed digits are received in the local register 34 and analyzed by the number and code translator 46, which accesses the line marker and scanner 50 to mark the line circuit 16. A switch mark is also extended from the register to the junctor to access the junctor control, which marks the trunk link network. Path-finding through the trunk link network 52 then establishes a connection from party A having line circuit 14 through the line link network 24, junctor 26, trunk link network 52, universal trunk 60, operator service link network 68, transfer circuit 74, transfer line circuit 20, line link network 24, junctor 28, trunk link network 52, ringing control 56, and line link network 24 to line circuit 16 and party B, for example. Ringing is then extended from the ringing control to party B and ring-back is extended to party A.

If party B does not answer, party A may flash the switch hook a second time which is detected on this occasion in the transfer circuit and causes release of the transfer circuit and all of the ESC elements connected thereto. Under these conditions, party A will then be again connected solely to the outside world through the universal trunk 60.

If party A releases before party B answers, the outside world is released from hold by the transfer circuit and receives ring-back from the ringing control. The transfer circuit starts a time-out which will automatically connect the outside world to the operator if the party B does not answer within a prescribed time. Once the time-out signal has been generated indicating that the prescribed time has elapsed, this signal will access the universal trunk 60 and cause a QRFS signal to be generated in the trunk initiating the connection of the trunk to an available operator so that the operator may handle any further requests from the outside world for service. On the other hand, if the party B answers before the time-out signal is generated, the parties will be connected and a rerouting of the connection will be automatically initiated in a manner to be described below.

If party A does not release before party B answers, parties A and B will be connected for communication while the outside world remains on hold from the transfer circuit. Under these conditions, party A may flash the hook switch which will cause release of the hold in the transfer circuit and place the three parties in a conference connection. At this point, if party B releases, the transfer circuit will release along with the ESC equipment associated therewith so that party A will remain connected to the outside world solely through the universal trunk. On the other hand, if party A releases, party B will be connected to the outside world through the transfer circuit and a rerouting of the connection will be automatically initiated in a manner to be described below.

REROUTING-TRANSFER COMPLETE

The parties A and B having line circuits 14 and 16, respectively, may be in a three-way conference with the outside world, or the outside world may still be on hold with parties A and B connected together as a result of a transfer operation. Under these circumstances, party A is connected from line circuit 14 through the line link network 24, junctor 26, trunk link network 52, universal trunk 60, operator service link network 68, transfer circuit 74, transfer line circuit 20, line link network 24, junctor 28, trunk link network 52, and line line network 24 to the line circuit 16, for example. As is quite apparent, if party A releases at this point, party B will be connected to the outside world through the universal trunk 60 via a rather roundabout path including a number of pieces of equipment rather than the more direct path through a single junctor and the trunk link network 52. Accordingly, the system in accordance with the present invention under these circumstances initiates an automatic rerouting of the connection to establish a parallel connection from the line circuit 16 through an available junctor and the trunk link network 52 to the universal trunk 60 so as to permit release of the more roundabout path through the transfer circuit.

When party A releases under the conditions set forth above, the release is detected in the transfer circuit which automatically releases the hold on the outside world if that condition still exists. The transfer circuit then extends a release signal over the talking logic to release party A and the switch train to line circuit 14. An RFS signal is also extended from the transfer circuit to the transfer common 86 to acquire the services of that circuit. The transfer common 86 has a direct appearance at the input of the service link network 32 so as to provide for connection to a local register. The transfer common receives the called line number which was stored in the transfer circuit at the time of the marking operation for the original transfer connection and outpulses this number to the local register through the service link network 32. The number and code translator 46 then extends the director number designated by the outpulsed digits via line 45 and the ESC interface and store 66 back to the transfer common where the number is compared to the number being outpulsed to insure that the correct number is being switched.

If the comparison made in the transfer circuit proves that the correct line is being switched, the number and code translator 46 under control of the transfer common causes the line marker/scanner 50 to enter a forced marking mode of the busy party B to override the normal busy condition of the line circuit 16 and mark the line circuit appearance at the line link network 24. At the same time, the local register extends a mark through the transfer common 86, transfer circuit 74 and operator service link network 68 to mark the junctor output of the universal trunk 60. Premature ring trip of the ringing control associated with the connection is also effected to prevent a ringing of the parties. Path-finding through the trunk link network 52 then effects a connection between line circuit 16 and the universal trunk 60 to the outside world, which path is in parallel to the previous path extending from the line circuit 16 through the transfer circuit to the universal trunk 60. Once the parallel path has been established, the switch mark extending from the register ends. The transfer circuit along with the transfer common and associated ESC equipment releases when answer supervision is detected through the direct way.

It should be noted in connection with this operation that the original path from the line circuit 16 through the transfer circuit and universal trunk to the outside world is maintained during the entire rerouting operation so that communication between the parties is not interrupted. It is only after the second parallel path has been established that the original path is released so that no interruption of the communication between the parties is possible. Indeed for a short period of time communication between the parties is effected over both of the parallel paths.

As indicated in the foregoing descriptions of the various operations performed by the system of the present invention, each time access to an operator position circuit is requested from one of the universal trunks or attendant trunks, a QRFS signal is generated and extended to the queue along with the identifying number of the trunk which is stored in the sequence of receipt in the queue. In this way, the trunks are not serviced in the order in which they are scanned, but are serviced in the order in which the requests for access to the operator are received. In a system having an extremely large number of trunks, this arrangement prevents a trunk which is positioned at the last part of the scanning sequence from having to wait an unnecessary length of time while trunks prior to that in the scanning sequence are serviced. However, should it be desired not to provide a queue in the system, the request for operator service from the trunks can be extended directly in the form of a GRFS signal on bus 99 to the trunk scanner 89, in which case the trunks will be serviced in the order in which they are scanned. The same is true if the queue should become disabled for any reason.

It should also be noted that various permutations of portions of the above-described operations can be effected by the system in a manner which should be obvious from this disclosure. Thus, consecutive transfer operations by parties having the proper class of service, which operations may also include the services of the operator are possible.

NIGHT SERVICE CIRCUIT

The present invention relates to night service circuit of the universal type, that is, one which actuates an alarm which may be detected in a plurality of locations or throughout the facility serviced by the private branch exchange so that response to the alarm by the night service attendant or anyone capable of operating the equipment can be effected from any available subscriber station.

Figure 4:
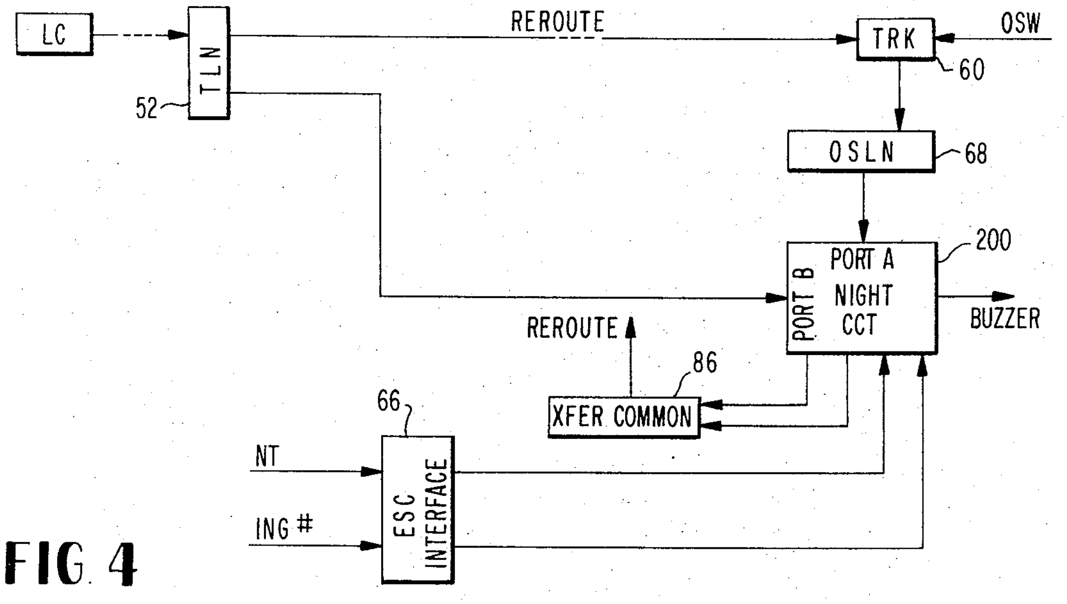
FIG. 4 is a more simplified block diagram of a portion of the system of FIGS. 1–3, illustrating the basic function of the night service circuit of the present invention.

As seen in the simplified block diagram of FIG. 4, the night service circuit 200 has a port A which has the appearance of a loop circuit and is connected to the operator service link network OSLN, a port B which has the appearance of a trunk circuit and is connected to the trunk link network TLN, and output connections providing the appearance of a transfer circuit extending to the transfer common. Thus, the night service circuit is essentially a hybrid of a loop circuit, a trunk circuit and a transfer circuit.

When the outside world dials the listed directory number of the exchange, the call is connected to a universal trunk, which immediately requests the services of a DPA and is connected through the operator service link network OSLN and the accessed DPA to an incoming register in the manner already described. The listed directory number is detected and the trunk is signaled on the LDN lead to initiate a request for an operator. However, since all of the operator positions are set on "night service", the GRFS signal received in the trunk scanner 89 will be converted to an NRFS signal which is forwarded to the night service circuit 200 and connection of the trunk to the night service circuit 200 through the operator service link network OSLN is effected. Once the system determines that the connection of the night service circuit 200 has been completed through the OSLN to the trunk, an alarm in the form of a buzzer, bell, flashing light, etc., is actuated from the night service circuit to signal the night service attendant.

As soon as the night service attendant detects the alarm, he merely proceeds to the nearest subscriber station and dials the special code of the night service circuit, which code is detected in the number and code translator 46, causing the ESC to effect a connection of the line circuit through the TLN to port B of the night circuit 200. As soon as connection of the subscriber station occupied by the night service attendant is effected, the number of that line circuit along with a night transfer indication is forwarded from the ESC portion of the system to the ESC interface and store 66, which passes these signals on to the night service circuit 200 where the calling line number is stored. The night service circuit also accesses the transfer common 86 at this time and the calling number is forwarded from the night service circuit into the transfer common 86, which then begins a rerouting of the call in the manner described previously to effect a direct connection between the line circuit being used by the night service attendant and the universal trunk which has been seized by the outside world. It should be noted at this point that no communication connection has yet been effected between the night service attendant and the outside party, which communication connection is provided for the first time as a result of the rerouting operation on the direct connection from the subscriber station selected by the night service attendant through the trunk link network to the universal trunk. When the rerouting is completed, the night service circuit is released from the transfer common which also releases at that time.

Figure 5:
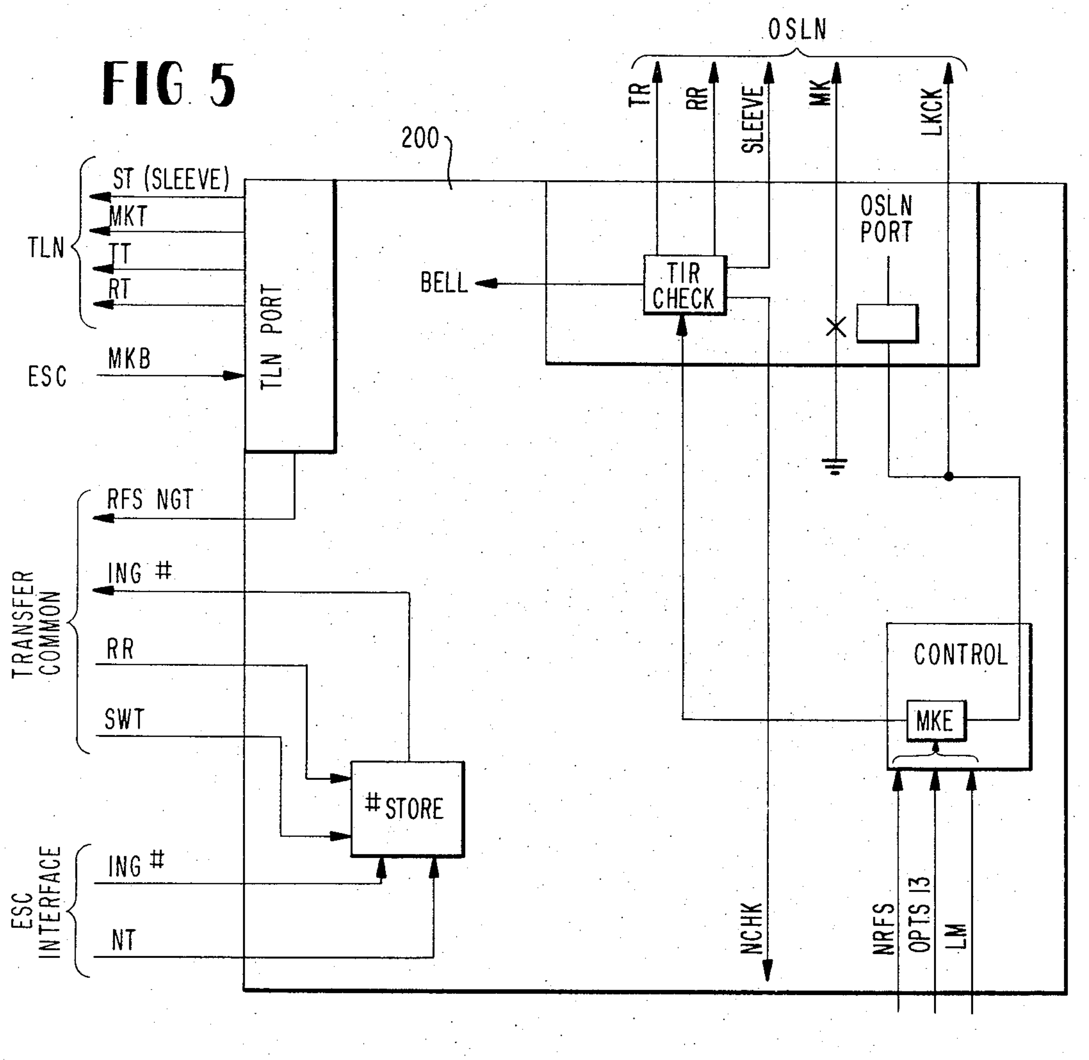
FIG. 5 is a simplified schematic diagram of the night service circuit of the present invention.

FIG. 5 provides a more detailed view of the night service circuit 200. The request for service signal NRFS is received, along with the operator time slot signal OPTS 13 and the signal LM from the rotary, in a control portion of the circuit, which generates a mark signal MKE in response thereto. The mark signal MKE operates a relay in the OSLN port to place ground on the mark lead MK to the OSLN and also is forwarded as a link check signal LKCK which initiates the pathfinding through the OSLN. The mark signal MKE also extends a signal MKD to the tip and ring check circuit in the OSLN port so that when a connection has been established through the OSLN from the night service circuit to the universal trunk, connection on the tip and ring leads TR and RR will serve to actuate the alarm, and at the same time a dummy load will be connected across the tip and ring leads TR and RR.

The night service circuit 200 is also provided with a number store which receives the calling line number from the ESC interface and store 66 along with the night transfer signal NT and stores the calling line number until requested. At the time the night service attendant dials the number designating the night circuit, the ESC extends a mark on lead MKB to the TLN port of the night circuit, and this mark is immediately returned on lead MKT to the trunk link network. At this time, the alarm is disabled and a request for service signal RFSNGT is forwarded to the transfer common to acquire that circuit. The transfer common then returns an enable signal on line RR causing the number store to transfer the calling line number to the transfer common. The transfer common then proceeds to reroute the call so as to establish a direct connection from the calling line circuit through the trunk link network to the universal trunk which is connected to the outside party. When the reroute connection is completed, the transfer common signals the night circuit via line SWT, which clears the number store and effects a release of the night circuit. The transfer common then also releases.

The number store portion of the night circuit may take the form of any conventional storage arrangement wherein a binary coded decimal numerical designation is stored in response to the enabling signal received on line NT. The output from the number store also is responsive to enabling on line RR from the transfer common to effect a transferring of the line number which is stored therein to the transfer common, and is also responsive to enabling of the line SWT from the transfer common to effect erasure of the number stored in the number store. Since such an arrangement may take different conventional forms and is within the ability of one of ordinary skill in the art, the details of the number store and control arrangement therefore are not described and illustrated in detail herein.

Figure 6:
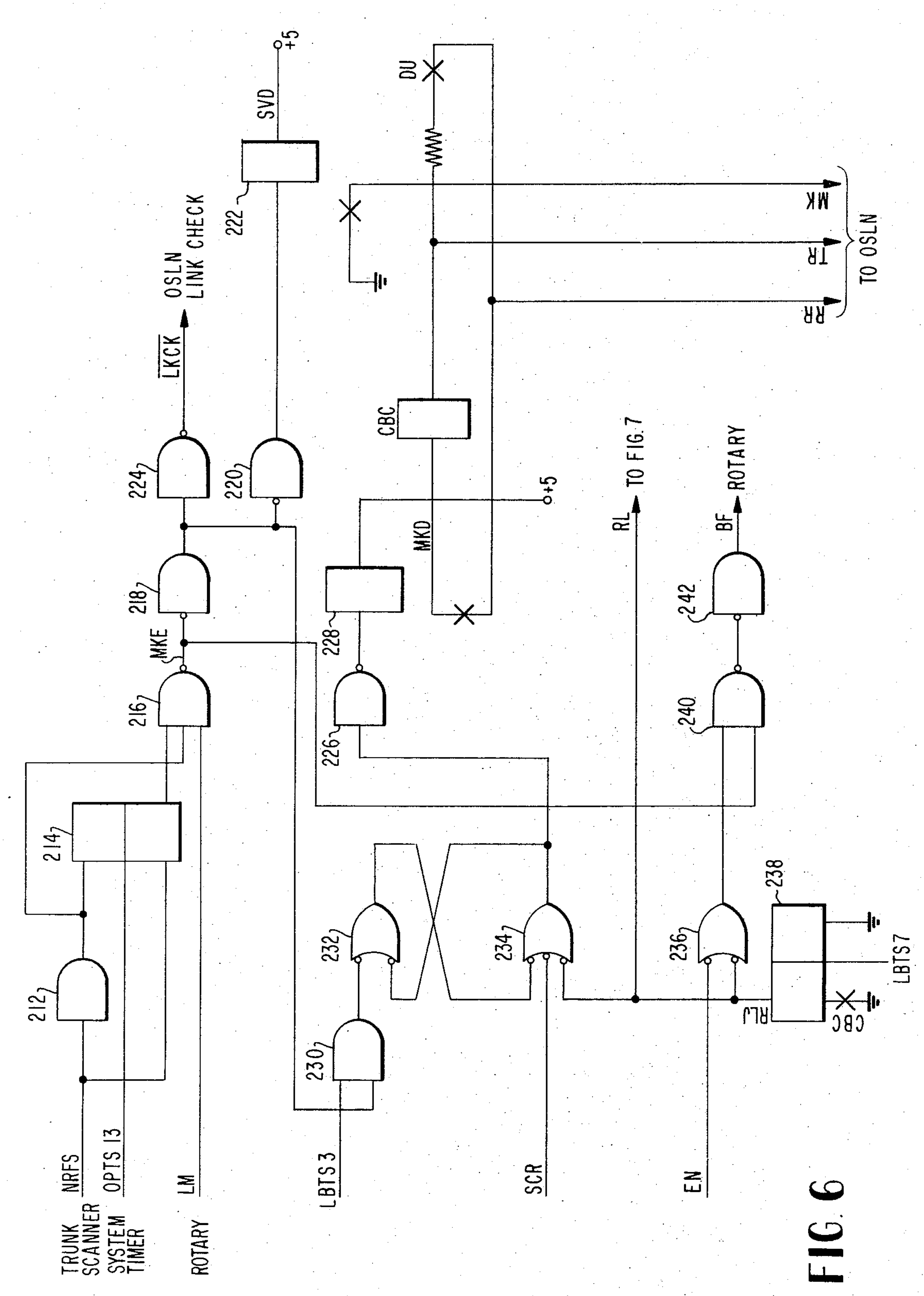
FIG. 6 is a schematic circuit diagram of the control and OSLN port portions of the night service circuit of the present invention.

FIG. 6 illustrates a schematic circuit diagram of the control and OSLN port portions of the night service circuit of the present invention. The trunk scanner, upon detecting a request for operator at a time when the operator position circuits are on night service, generates a night request for service signal NRFS which is applied directly to the set side of flip-flop 214 and through gate 212 to the reset side of the flip-flop. The flip-flop 214 will then be enabled upon receipt of the operator time slot signal OPTS 13 from the system timer.

The AND gate 216 receives inputs from the output of gate 212, from the set output of flip-flop 214, and from the LM lead from the rotary indicating that the night service circuit has been preselected by the rotary. The enabled AND gate 216 generates the mark signal MKE which places ground at the output of gate 220 via gate 218 so as to actuate the relay 222. Relay 222 connects ground to the mark lead extending to the operator service link network OSLN. At the same time, a link check signal LKCK is generated at the output of gate 224 as a result of the enabling of AND gate 216 via gate 218, the link check signal serving to initiate the path-finding through the operator service link network OSLN.

The timing operations for the various functions performed by the circuits in the exchange are controlled by the LB time slots which make up each operator time slot. As indicated in our copending application Ser. No. 293,518, filed Sept. 29, 1972, each operator time slot is divided into ten LB time slots LBTS1–LBTS10, which LB time slots are used to control the sequence of operations performed by the various circuits in the exchange. At the time of time slot LBTS3 the mark enable signal MKE at the output of AND gate 216 will enable gate 230 setting the flip-flop formed by gates 232 and 234. Thus, ground will be provided at the output of gate 226 to enable the relay 228 closing the contacts in series with the CBC relay across the tip and ring leads TR and RR extending to the operator service link network OSLN. The CBC relay performs a continuity tip and ring check and will be enabled once the tip and ring leads are connected through the OSLN to the trunk.

Once the CBC relay is enabled by the connection of the tip and ring leads through the OSLN to the trunk, the flip-flop 238 will be enabled so as to permit setting of this flip-flop upon receipt of the time slot LBTS7 from the system timer. The setting of flip-flop 238 produces a signal RL at the set output thereof which is applied to the gate 234 forming one part of the flip-flop with gate 232 so that upon receipt of the scan reset signal SCR from the system timer the flip-flop will be reset thereby disabling the relay 228 and the link check circuit associated therewith.

At the time of the path-finding operation through the OSLN, the link check equipment (not shown) will enable the line EN to OR gate 236 whose output is connected to one input of the AND gate 240. The AND gate 240 is then enabled by the mark enable signal MKE from the output of AND gate 216 so as to generate a BF signal at the output of gate 242 which actuates the rotary and causes it to step to the next available night service circuit. The signal BF is continued even after path-finding has been completed by application of the signal RL to gate 236 once the flip-flop 238 is set at time slot LBTS7.

Figure 7:
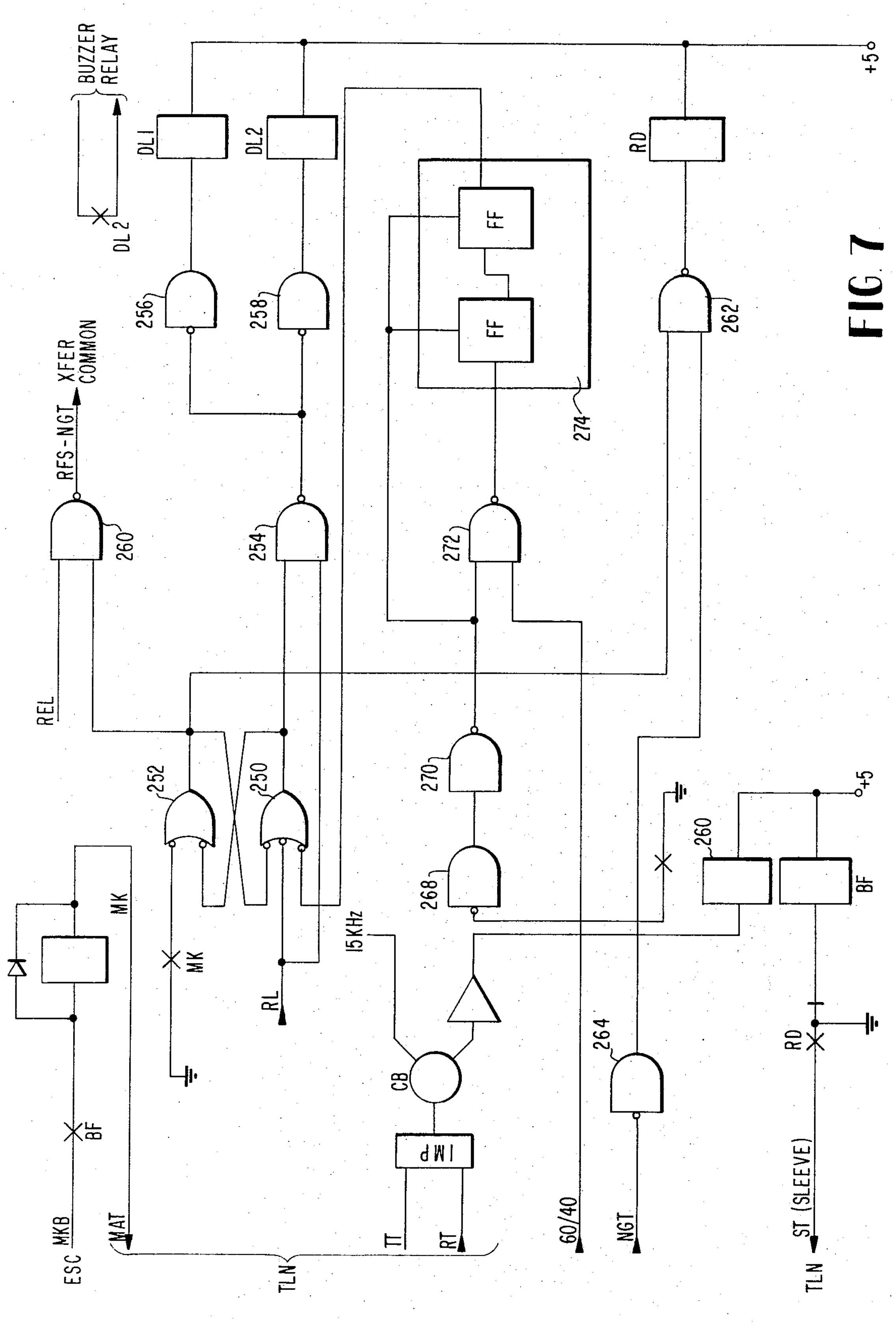
FIG. 7 is a schematic circuit diagram of the TLN port portion of the night service circuit of the present invention.

FIG. 7 is a schematic circuit diagram of the TLN port portion of the night service circuit. When the flip-flop 238 (FIG. 6) is set to produce the output RL, this output is applied to a gate 250, which forms a flip-flop with gate 252. The signal RL sets the flip flop formed by these gates thereby enabling AND gate 254 so as to actuate the relays DL1 and DL2 via gates 256 and 258, respectively. The actuation of the relay DL2 closes the circuit to the alarm so that the alarm is sounded in plural locations or throughout the facility serviced by the exchange. The sounding of the alarm will then continue until the night service attendant or other individual dials the number designated for the night service circuit and that circuit is accessed from the ESC.

When the exchange detects the dialing of the number designated for night service from any subscriber station, the line number of that station is transferred into the ESC interface and line number store 66 along with the night service signal NT and a mark is extended from the ESC on lead MKB through the closed contacts of the busy/free relay BF and the mark relay MK back on line MKT to the trunk link network. This will enable the mark relay MK, whose closed contacts will then connect ground to the gate 252 of the flip-flop formed with gate 250 thereby resetting this flip-flop to turn off the buzzer by deactuating the relay DL 2. The dummy load will also be removed from the tip and ring leads from the night service circuit to the trunk via the OSLN by disabling of the relay DL1 and a request for service signal RFSNGT will be generated at the output of AND gate 260 upon receipt of a timing signal $\overline{REL}$ from the system timer 94. The request for night service signal will be forwarded to the transfer common requesting connection thereto.

The resetting of the flip-flop formed by gates 250 and 252 provides an output to AND gate 262 which is enabled via gate 264 by the signal NGT which is generated as a result of the position circuits being placed on night service. The enabled AND gate 262 actuates the RD relay so as to switch ground from the busy/free relay BF to the sleeve lead ST to the trunk link network. This disables the busy/free relay BF thereby preventing further marking of the night service circuit until the RD relay is released.

Upon completion of the path through the trunk link network, the calling bridge relay CB is connected from the night service circuit on the tip and ring leads TT and RT to the subscriber station being used by the night service attendant. The calling bridge relay CB provides a ground output which enables the relay 265 whose contacts close to connect ground to the input of gate 268 thereby enabling AND gate 272 via gate 270. The timing signal 60/40 from the system timer 94 toggles the flip-flop 274 through gate 272 thereby resetting the flip-flop formed by gates 250 and 252.

At this point, the transfer common has been connected to the night service circuit and receipt of the signal on line RR to the number store causes a transfer of the calling line number to the transfer common. A rerouting of the call to provide a direct connection from the calling line circuit used by the night service attendant directly through the trunk link network to the universal trunk connected to the outside party is then undertaken under control of the transfer common, as described previously. With the direct connection of the night service attendant to the outside party through the universal trunk, the night service circuit and the transfer common circuit can be released so that they are available for other service during the duration of the call.

As can be seen from the foregoing description, the night service circuit of the present invention provides a relatively simple circuit arrangement which is capable of effecting a signaling of the night service attendant anywhere on the premises serviced by the exchange and in conjunction with the transfer common circuit will provide connection of the night service attendant directly through the trunk link network to the universal trunk accessed by the outside party. In this way, the night service circuit acts as a common equipment circuit which releases once the communication connection has been established between the night service attendant and the outside party so that it is available for other use during the remainder of that call. This materially reduces the amount of equipment needed in the system to handle the night service operation, especially in connection with electronic private automatic branch exchange systems of extremely large size.

I claim:

1. In a private automatic branch exchange including central office equipment provided with a plurality of line circuits, said central office equipment being interconnected with private branch equipment provided with a plurality of trunk circuits, an operator complex and transfer means for effecting transfer of an incoming communication connection of a trunk circuit from a first line circuit to a second line circuit in said central office equipment, a universal night service circuit comprising signal means actuating a signaling indicator, a dummy load, control means responsive to an incoming communication connection at one of said trunk circuits for connecting said dummy load to said trunk circuit including signal control means for actuating said signal means upon connection to said trunk circuit, a calling bridge relay arrangement, means in said central office equipment responsive to detection of a special dialed digit signal generated from a selected line circuit for connecting said calling bridge relay arrangement to said selected line circuit through said central office equipment, storage means for storing the identification of said selected line circuit and means responsive to connection of said calling bridge relay arrangement to said selected line circuit for actuating said transfer means to connect said trunk circuit to the line circuit whose identification is stored in said storage means through said central office equipment.

2. A universal night service circuit as defined in claim 1 wherein said private branch equipment includes trunk scanner means for scanning each of said trunk circuits and generating a request signal upon detection of an incoming communication connection to one of said trunk circuits and system timing means for generating timing signals for coordinating the operations of said equipment.

3. A universal night service circuit as defined in claim 2 wherein said control means includes first gating means responsive to receipt of a night service request signal from said trunk scanner means and a timing signal from said system timing means for generating a mark signal to initiate connection of said universal night service circuit to said one trunk circuit and detector means responsive to detection of connection of a closed loop connection to said trunk circuit for connecting said dummy load to said closed loop and actuating said signal control means.

4. A universal night service circuit as defined in claim 3 wherein said operator complex of said private branch equipment includes an operator service link network for selectively connecting said trunk circuits to selected operator position circuits, said universal night service circuit being connected by a pair of communication lines to said one trunk circuit through said operator service link network in response to generation of said mark signal by said first gating means.

5. A universal night service circuit as defined in claim 1 wherein said central office equipment includes a trunk link network for selectively interconnecting trunk circuits and line circuits and common control means for detecting requests for service from said line circuits and establishing a communication connection from said line circuits through said trunk link network in response thereto, said storage means receiving the identification of said selected line circuit from said common control means.

6. A universal night service circuit as defined in claim 5 wherein said means for connecting said calling bridge relay arrangement to said selected line circuit is actuated by a control signal from said common control means for extending a communication connection from said trunk link network to said relay arrangement when said common control detects said special dialed digit signal.

7. A universal night service circuit as defined in claim 6 wherein said control means includes means for extending a communication connection to said one trunk circuit upon detection of a listed directory number call in conjunction with a night service request, said communication connection extending to said trunk circuit being isolated from said communication connection to said calling bridge relay arrangement.

8. A universal night service circuit as defined in claim 7 including means responsive to said control signal from said common control for de-actuating said signal means.

9. In a private automatic branch exchange including a plurality of line circuits, a plurality of trunk circuits and a switching network for connecting a trunk circuit to one of said line circuits on an incoming call, a universal night service circuit responsive to listed directory calls comprising signal means actuating a signaling indicator, control means responsive to a listed directory call at one of said trunk circuits for actuating said signal means, a calling bridge relay arrangement, connection means responsive to detection of a special dialed digit signal generated from a selected line circuit for connecting said calling bridge relay arrangement to said selected line circuit through said switching network and de-actuating said signal means, storage means for storing the identification of said selected line circuit, transfer means responsive to said connection means for connecting said one trunk circuit directly to the line circuit identified by said storage means through said switching network, and means responsive to completion of said direct connection by said transfer means for releasing said calling bridge relay arrangement from connection to said selected line circuit.

10. A private automatic branch exchange as defined in claim 9 wherein said control means includes first gating means responsive to receipt of a service request signal from said one trunk circuit for extending a closed loop connection thereto and detector means responsive to detection of completion of said closed loop connection to said one trunk circuit for actuating said signal means.

11. A private automatic branch exchange as defined in claim 10, further including an operator service link network for selectively connecting said trunk circuits to selected operator position circuits, said universal night service circuit being connected to said one trunk circuit through said operator service link network in response to said first gating means.

12. A universal night service circuit as defined in claim 9 wherein said control means includes means for extending a communication connection to said one trunk circuit upon detection of a listed directory number call in conjunction with a night service request, said communication connection extending to said trunk circuit being isolated from said communication connection to said calling bridge relay arrangement.

13. A private automatic branch exchange as defined in claim 9 wherein said transfer means includes a direct connection to said switching network for initiating connection of said one trunk circuit to said selected line circuit on a communication connection which bypasses said night service circuit.

14. A private automatic branch exchange as defined in claim 13 wherein said switching network includes common control means for detecting requests for service from said line circuits and for establishing a communication connection from said line circuits to said trunk circuits in response thereto, said night service circuit including number storage means for storing the number of said selected line circuit derived from said common control means, said transfer means serving to actuate said common control means to connect said one trunk circuit to the line circuit whose number is stored in said number storage means.

15. In a private automatic branch exchange including central office equipment provided with a line link network, a service link network and a trunk link network for interconnecting a plurality of subscriber line circuits, said central office equipment being interconnected with private branch equipment provided with an operator service link network, a plurality of trunk circuits, a plurality of operator position circuits, and common control means for connecting said operator position circuits through said operator service link network to a selected trunk circuit, and transfer means for effecting transfer of an incoming communication connection from a first line circuit to a second line circuit through said trunk link network, a universal night service circuit comprising signal means actuating a signaling indicator, control means responsive to a listed directory number call at one of said trunk circuits for actuating said signal means, means responsive to detection of a special dialed digit signal generated from a selected line circuit for connecting a holding termination through said line link network to said selected line circuit, and means responsive to connection of said holding termination to said selected line circuit for actuating said transfer means to connect said trunk circuit to said selected line circuit directly through said trunk link network.

16. A universal night service circuit as defined in claim 15 wherein said private branch equipment includes trunk scanner means for scanning each of said trunk circuits and generating a request signal upon detection of an incoming communication connection to one of said trunk circuits and system timing means for generating timing signals for coordinating the operations of said equipment.

17. A universal night service circuit as defined in claim 16 wherein said control means includes first gating means responsive to receipt of a night service request signal from said trunk scanner means and a timing signal from said system timing means for generating a mark signal to initiate connection of said universal night service circuit to said one trunk circuit and detector means responsive to detection of connection of a closed loop connection to said trunk circuit for connecting said dummy load to said closed loop and actuating said signal control means.

18. A universal night service circuit as defined in claim 15 wherein said control means includes means for extending a closed loop connection to said one trunk circuit upon detection of a listed directory number call in conjunction with a night service request, said closed loop connection being isolated from said holding termination.

19. A universal night service circuit as defined in claim 15 wherein said transfer means includes a direct connection to said switching network for initiating connection of said one trunk circuit to said selected line circuit on a communication connection which bypasses said night service circuit.

20. A universal night service circuit as defined in claim 18 including means responsive to said transfer means completing connection of said trunk circuit to said selected line circuit for releasing said holding termination and said closed loop connection.

21. In a private automatic branch exchange including a plurality of subscriber line circuits, a plurality of local registers capable of storing and analyzing digit signals, a line link network, a service link network, a plurality of junctors for connecting a line circuit via said line link network and said service link network to a selected local register, a plurality of ringing controls, a plurality of trunk circuits, a trunk link network connecting said junctor circuits via said ringing controls to said line link network or to said trunk circuits, a plurality of operator position circuits, an operator service link network connecting said operator position circuits to said trunk circuits, a plurality of transfer line circuits connected to the input of said line link network and a plurality of transfer circuits connected on the operator side of said operator service link network for effecting connection of a selected trunk circuit to one of said transfer line circuits, said transfer common means having a direct connection with the input of said service link network for establishing a communication path directly from a trunk circuit through said trunk link network and said line link network, a universal night service circuit comprising signal means actuating a signal indicator, control means responsive to receipt of a listed directory number call at one of said trunk circuits for actuating said signal means, and means responsive to receipt of a special dialed digit signal from a selected line circuit in one of said registers for de-actuating said signal means and actuating said transfer common means to connect said selected line circuit to said one trunk circuit.

22. A private automatic branch exchange as defined in claim 21 wherein said transfer common means is directly connected to one input of said service link network for initiating connection of said one trunk circuit to said selected line circuit on a communication connection which bypasses said night service circuit.

23. A private automatic branch exchange as defined in claim 22 wherein said private branch equipment includes trunk scanner means for scanning each of said trunk circuits and generating a request signal upon detection of an incoming communication connection to one of said trunk circuits and system timing means for generating timing signals for coordinating the operations of said equipment.

24. A private automatic branch exchange as defined in claim 23 wherein said control means includes first gating means responsive to receipt of a night service request signal from said trunk scanner means and a timing signal from said system timing means for generating a mark signal to initiate connection of said universal night service circuit to said one trunk circuit and detector means responsive to detection of connection of a closed loop connection to said trunk circuit for connecting a dummy load to said closed loop and actuating said signal control means.

25. A private automatic branch exchange as defined in claim 24 wherein said universal night service circuit includes a first holding termination connected to said one trunk circuit by said control means in response to detection of a night service request from said trunk circuit and a second holding termination connected through said trunk link network to said selected line circuit upon detection of said special dialed digit signal.

26. A private automatic branch exchange as defined in claim 25 wherein said universal night service circuit includes means responsive to connection of said selected line circuit to said one trunk circuit for releasing said first and second holding terminations.

* * * * *